US008653711B2

(12) United States Patent  (10) Patent No.: US 8,653,711 B2
Burch et al.  (45) Date of Patent: Feb. 18, 2014

(54) PARALLEL WOUND STATOR

(75) Inventors: Jerry C. Burch, Waynesville, OH (US);
Scott P. Kreger, Springfield, OH (US)

(73) Assignee: Globe Motors, Inc., Dayton, OH (US)

( * ) Notice: Subject to any disclaimer, the term of this patent is extended or adjusted under 35 U.S.C. 154(b) by 399 days.

(21) Appl. No.: 13/075,248

(22) Filed: Mar. 30, 2011

(65) Prior Publication Data

US 2011/0241476 A1  Oct. 6, 2011

Related U.S. Application Data

(60) Provisional application No. 61/319,944, filed on Apr. 1, 2010.

(51) Int. Cl.
*H02K 3/28* (2006.01)
(52) U.S. Cl.
USPC .............................................. 310/184; 29/596
(58) Field of Classification Search
USPC .......... 310/71, 180, 184, 185, 194, 198, 208; 29/596–598
See application file for complete search history.

(56) References Cited

U.S. PATENT DOCUMENTS

| | | | |
|---|---|---|---|
| 3,407,321 A | 10/1968 | Grad | |
| 4,225,800 A | 9/1980 | Magnaghi | |
| 4,954,740 A | 9/1990 | Brigham | |
| 5,044,065 A | 9/1991 | Dyke et al. | |
| 5,508,578 A * | 4/1996 | Suzuki et al. | 310/194 |
| 5,519,271 A * | 5/1996 | Sakashita et al. | 310/71 |
| 5,900,687 A * | 5/1999 | Kondo et al. | 310/71 |
| 6,030,260 A * | 2/2000 | Kikuchi et al. | 439/890 |
| 6,137,198 A * | 10/2000 | Kawamura | 310/71 |
| D445,762 S | 7/2001 | Shida et al. | |
| 6,313,556 B1 | 11/2001 | Dombrovski et al. | |
| 6,333,579 B1 | 12/2001 | Hirano et al. | |
| 6,600,244 B2 | 7/2003 | Okazaki et al. | |
| 6,710,475 B2 | 3/2004 | Nishida et al. | |
| 6,787,959 B2 | 9/2004 | Weimer | |
| 6,856,055 B2 | 2/2005 | Michaels et al. | |
| 6,894,410 B2 | 5/2005 | Kobayashi et al. | |
| 6,930,418 B2 | 8/2005 | Kobayashi et al. | |

(Continued)

FOREIGN PATENT DOCUMENTS

| | | |
|---|---|---|
| DE | 102004062816 A1 | 7/2006 |
| JP | 2008301633 A | 12/2008 |
| WO | 2005101611 A2 | 10/2005 |

OTHER PUBLICATIONS

International Preliminary Report on Patentability; International Application No. PCT/US2011/030889; Oct. 11, 2012; The International Bureau of WIPO.

(Continued)

*Primary Examiner* — Tran Nguyen
(74) *Attorney, Agent, or Firm* — Stevens & Showalter LLP

(57) ABSTRACT

A wound stator includes a plurality of windings, each winding including a primary lead and a secondary lead defined by free ends of the winding. Each of the windings being associated with a first, second or third phase. For each phase, a plurality of the primary leads are wrapped around a termination side of the stator to a common primary base lead to form a primary lead connection for the phase. For each phase, a plurality of the secondary leads are wrapped around the termination side of the stator to a common secondary base lead to form a secondary lead connection for the phase.

14 Claims, 14 Drawing Sheets

(56) References Cited

U.S. PATENT DOCUMENTS

| | | | |
|---|---|---|---|
| 7,045,920 B2 | 5/2006 | Ohuchi et al. | |
| 7,061,149 B2 | 6/2006 | Crane | |
| 7,102,263 B2 | 9/2006 | Takano et al. | |
| 7,135,793 B2 | 11/2006 | Seguchi et al. | |
| 7,164,217 B2 | 1/2007 | Kabasawa et al. | |
| 7,187,094 B1 * | 3/2007 | Walker | 310/71 |
| 7,193,345 B2 | 3/2007 | Shinzaki et al. | |
| 7,205,689 B2 | 4/2007 | Lukenich | |
| 7,219,417 B2 | 5/2007 | Kobayashi et al. | |
| 7,262,529 B2 | 8/2007 | Klappenbach et al. | |
| 7,262,538 B2 | 8/2007 | Yoneda et al. | |
| 7,271,512 B2 * | 9/2007 | Lee et al. | 310/43 |
| 7,365,460 B2 | 4/2008 | Herlet et al. | |
| 7,382,075 B2 | 6/2008 | Wang et al. | |
| 7,489,058 B2 | 2/2009 | Drubel et al. | |
| 7,557,478 B2 | 7/2009 | Hoshika | |
| 7,578,047 B2 | 8/2009 | Wang et al. | |
| 7,586,231 B2 | 9/2009 | Wang et al. | |
| 7,595,572 B2 | 9/2009 | Haga et al. | |
| 2006/0022544 A1 | 2/2006 | Kinashi | |
| 2010/0019592 A1 | 1/2010 | Altindis | |

OTHER PUBLICATIONS

International Search Report and Written Opinion; Application No. PCT/US2011/030889; Apr. 4, 2012; European Patent Office.

* cited by examiner

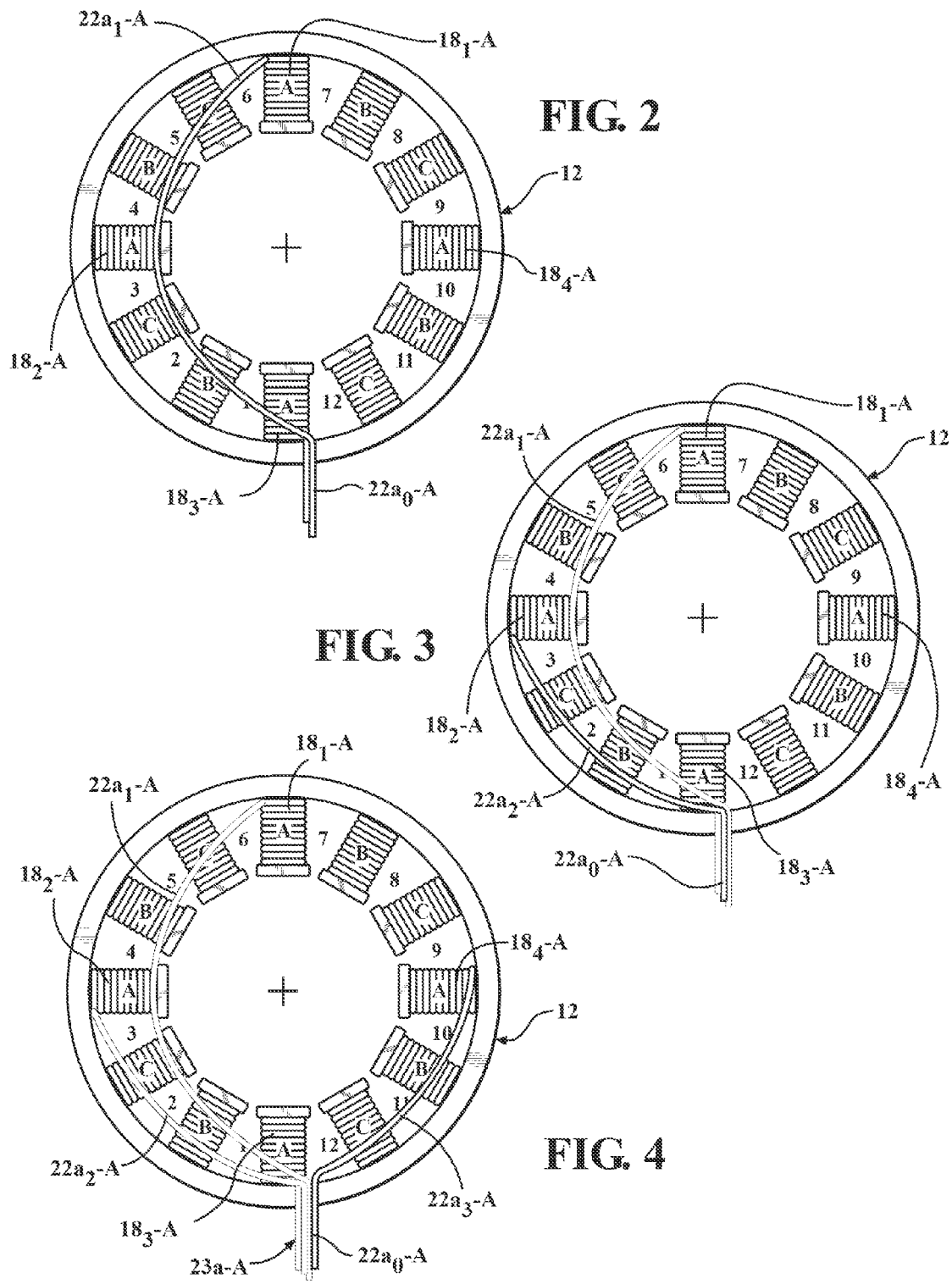

PARALLEL WOUND STATOR

CROSS-REFERENCE TO RELATED APPLICATIONS

This application claims the benefit of U.S. Provisional Application No. 61/319,944, filed Apr. 1, 2010, which is incorporated herein by reference.

FIELD OF THE INVENTION

The present invention relates to construction of a wound stator for a dynamo-electric machine and, more particularly, to an end wrapping configuration to form end connections for coil windings on the stator.

BACKGROUND OF THE INVENTION

Field coils for stators of dynamo-electric machines are generally placed on radially inwardly extending teeth of the stator as wire windings. In stators used for motors, the motor performance may be affected by the size and geometry of the motor and by the "active materials" forming the motor. In a brushless DC motor, for example, the active materials may comprise steel, magnets and copper forming the motor windings. For a given motor size, comprising a fixed amount of steel and magnet, providing additional windings (copper) located in the stator slots provides an increased amount of torque. Alternatively, if the field coils are formed with additional windings, it may be possible to reduce the axial length of the stator while maintaining the same performance that was achieved with a longer stator and lower number of windings. Generally, the slot geometry for stators is fixed such that the amount of the slot area that is filled with copper, i.e., the slot fill, is dependent on the efficiency with which the windings are positioned adjacent to each other within the slots.

Various factors affect the ability to efficiently position windings within the stator slots including interference from windings already positioned in a slot as additional wire is located in the slot. Thus, winding operations commonly involve a forming operation in which windings are periodically pushed or formed into closer engagement with each other to provide additional slot clearance for receiving further windings. In addition, in series wound stators, winding wire that extends across two or more slots defined between adjacent teeth at an end of the stator, i.e., cross-overs, may form a partial barrier covering a radial portion of the slots and limiting the amount of wire that may be added to the slots.

SUMMARY OF THE INVENTION

In accordance with an aspect of the invention, a method of winding a dynamo-electric stator is provided. The method comprises: providing a stator having a plurality of radially inwardly extending teeth; providing a plurality of wire turns around each of the teeth to form a wire winding on each of the teeth, the windings comprising first, second and third phase windings; each winding comprising a primary lead defined by a free end of the wire forming the winding and a secondary lead defined by a free end of the wire forming the winding, the primary and secondary leads extending from opposite sides of a respective tooth on a termination side of the stator; each phase comprising a plurality of the windings wherein each phase comprises a winding having a primary lead defining a primary base lead, a winding having a secondary lead defining a secondary base lead, two or more windings having primary leads defining at least an initial primary wrap lead and a last primary wrap lead, and two or more windings having secondary leads defining at least an initial secondary wrap lead and a last secondary wrap lead; performing an end wrapping operation for each phase comprising:

wrapping the initial primary wrap lead in a first circumferential direction around the termination side of the stator to a respective one of the primary base leads; wrapping the last primary wrap lead in a second circumferential direction, opposite to the first direction, around the termination side of the stator to the respective one of the primary base leads; wrapping the initial secondary wrap lead in the first direction around the termination side of the stator to a respective one of the secondary base leads; wrapping the last secondary wrap lead in the second direction around the termination side of the stator to the respective one of the secondary base leads; and joining the wrap leads associated with each of the primary and secondary base leads to form a primary and secondary lead connection for each of the phases.

In accordance with another aspect of the invention, a wound stator is provided for a dynamo-electric machine. The wound stator comprises a stator having a plurality of circumferentially spaced, radially inwardly extending teeth, and a plurality of discrete strands of wire, each strand of wire forming a plurality of turns around a respective tooth to define a winding on the respective tooth. Each winding comprises a primary lead defined by a free end of a respective one of the discrete strands of wire and a secondary lead defined by another free end of the respective one of the discrete strands of wire wherein each of the primary and secondary leads are located on a termination side of the stator. One of the primary leads defines a primary base lead, and one of the secondary leads defines a secondary base lead. A plurality of conductive paths extend from each of a plurality of the windings to the primary base lead and a plurality of conductive paths extend from the plurality of windings to the secondary base lead; and each of the conductive paths comprise one of the primary and secondary leads without additional conductive structure extending between the plurality of windings and the primary and secondary base leads.

In accordance with another aspect of the invention, a method of winding a dynamo-electric stator is provided. The method comprises: providing a stator having a plurality of radially inwardly extending teeth; providing a plurality of wire turns around each of the teeth to form a wire winding on each of the teeth, the windings comprising first, second and third phase windings; each winding comprising a primary lead defined by a free end of the wire forming the winding and a secondary lead defined by a free end of the wire forming the winding, the primary and secondary leads extending from opposite sides of a respective tooth on a termination side of the stator; each phase comprising a plurality of the windings wherein each phase comprises a winding having a primary lead defining a primary base lead, a winding having a secondary lead defining a secondary base lead, two or more windings having primary leads defining at least an initial primary wrap lead and a last primary wrap lead, and two or more windings having secondary leads defining at least an initial secondary wrap lead and a last secondary wrap lead; performing an end wrapping operation for the first, second and third phases, comprising:

wrapping the initial primary wrap leads in a first circumferential direction around the termination side of the stator to respective ones of the primary base leads; wrapping the initial secondary wrap leads in a second circumferential direction, opposite to the first direction, around the termination side of the stator to respective ones of the secondary base leads; wrapping the last primary wrap leads in the second circumferential direction around the termination side of the stator to respective ones of the primary base leads; wrapping the last secondary wrap leads in the first circumferential direction around the termination side of the stator to respective ones of the secondary base leads; and joining the wrap leads associated with each of the primary and secondary base leads to form a primary and secondary lead connection for each of the phases.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIGS. 2-4 illustrate steps for wrapping primary leads of first phase windings on the stator;

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
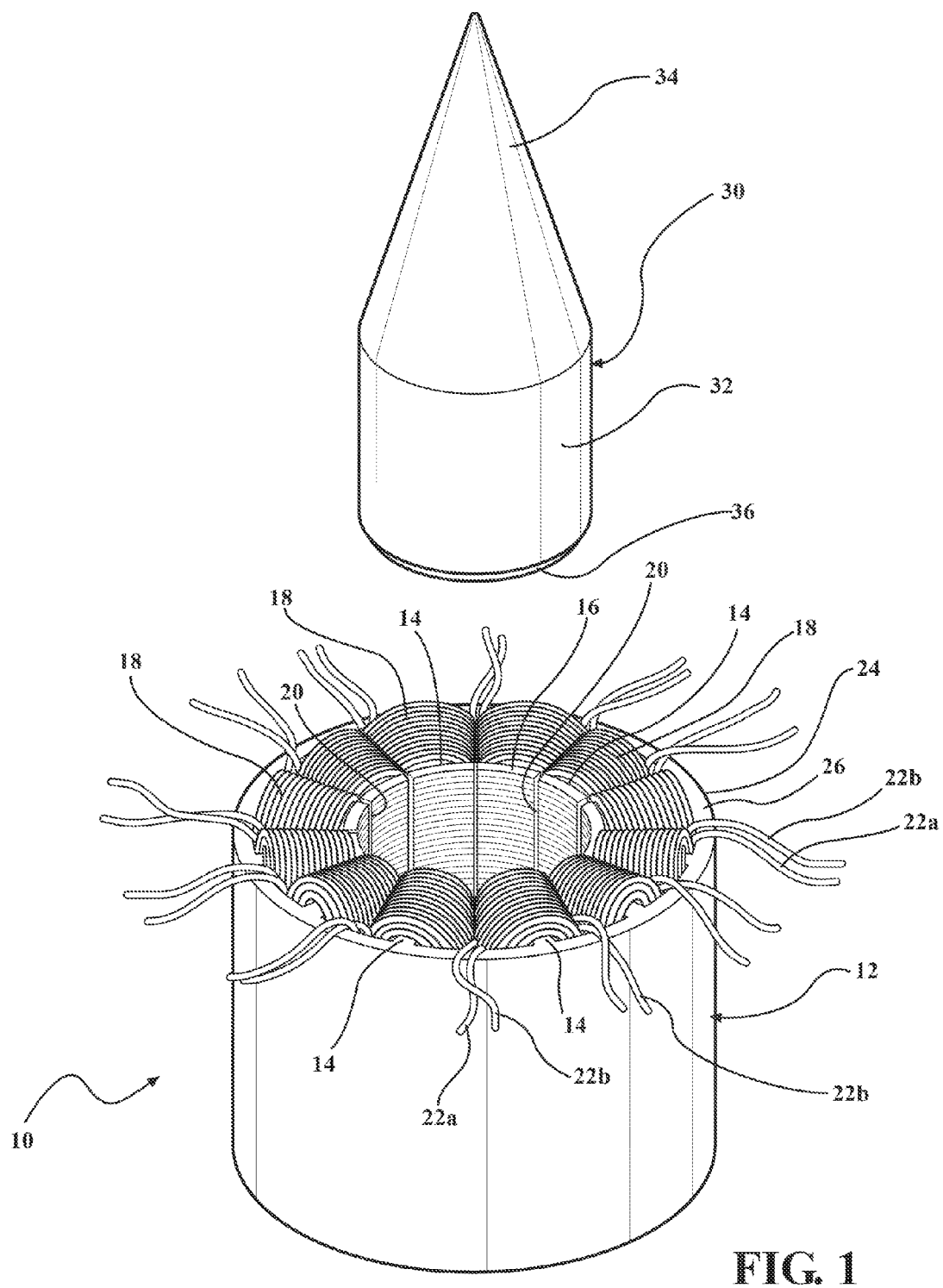
FIG. 1 is a perspective view of a stator stack carrying windings prior to a lead wrapping operation.

Referring to FIG. 1, the present invention comprises a method of constructing a wound stator 10. The stator 10 may comprise a stator stack 12 formed of a plurality of laminations bonded together to form a unitary structure. The stator stack 12 includes a plurality of radially inwardly extending teeth 14 having inner ends comprising inner surfaces 16 defining an inner diameter of the stator 10 for receiving a rotor (not shown). It should be noted that although the illustrated stator stack 12 is shown herein as including twelve teeth 14, the present invention may be practiced with a stator stack 12 having a different number of teeth 14 such as, for example, nine teeth.

Each of the teeth 14 receive a plurality of wire turns forming a wire winding 18 on each of the teeth 14. In accordance with an aspect of the invention, wire may be fed from within the inner diameter of the stator 10 through slots 20 between the teeth 14 during a winding operation forming the windings 18. The wire windings 18 on the stator stack 12 are formed as parallel windings, where each wire winding 18 is formed from a discrete strand of wire having a free end on either side of a respective tooth 14. The free ends of the windings 18 comprise a primary lead 22a and a secondary lead 22b extending from the tooth 14 on a termination side 24 of the stator 10. Forming the windings 18 as parallel windings enables the present stator 10 to be formed with a higher slot fill, in that the windings provided to each tooth 14 may be wound on radially outer portions of the teeth, i.e., adjacent to a peripheral portion 26 of the stator stack 12, to a greater extent than may be possible for series wound windings.

Further, it should be noted that each winding 18 may comprise more than one wire. For example, each winding 18 may be formed with two or more wires wound simultaneously around a respective tooth 14. Providing two or more wires forming the windings 18 permits a smaller diameter wire to be used for the windings 18, which may permit a closer packing of wires adjacent to each other, i.e., with less unfilled space, than a larger diameter wire, facilitating a higher slot fill density.

In the illustrated embodiment, the wound stator 10 comprises a stator for use in a three phase motor (not shown) such as a three phase brushless DC motor. Hence, in the illustrated stator 10 including twelve windings, each of the phases comprises three windings 18. The windings 18 for each phase are located on teeth 14 spaced from each other 90 degrees around the circumference of the stator stack 12.

In accordance with an aspect of the invention, the primary and secondary leads 22a, 22b are wrapped in a predetermined pattern around the peripheral portion 26 of the stator stack 12 to connect the windings 18 associated with a respective phase together in a parallel connection of the windings 18 for each phase. As will be described further below, a wrapping operation is performed on the primary and secondary leads 22a, 22b to provide a woven pattern that causes the leads 22a, 22b to engage each other for maintaining the leads 22a, 22b in a compact wrap structure that lies close to the stator stack 12.

Referring to FIGS. 2-19, the steps of the wrapping operation are illustrated diagrammatically. Generally, the wrapping operation comprises performing a wrapping operation for each phase in succession, where the separate phases are designated by the letters A, B and C. During the wrapping operation, three of the primary leads 22a for a phase, designated as primary wrap leads, are wrapped to the remaining one of the primary leads 22a, designated a primary base lead, to define a wrapped group of primary leads 22a. Subsequently, three of the secondary leads 22b for the phase, designated as secondary wrap leads, are wrapped to the remaining one of the secondary leads 22b, designated as a secondary base lead, to define a wrapped group of secondary leads 22b. The primary and secondary wrap leads are designated by $22a_n$ and $22b_n$, respectively where n is a wrap wire number 1, 2 or 3. The primary and secondary base leads are designated by $22a_0$ and $22b_0$, respectively.

It should be noted that in FIGS. 2-19, for ease of illustration, each of the wrapping operations for forming either the wrapped group of primary leads 22a or the wrapped group of secondary leads 22b of a phase are shown separately in three successive views, i.e., showing only the leads associated with the group, without including illustration of other wrapped leads. In addition, the lead 22a, 22b being wrapped is illustrated by a bold solid line, while previously wrapped leads 22a, 22b in the group are designated by a thinner line.

FIGS. 2-4 illustrate a wrapping operation for the primary leads 22a of a first phase A for the wound stator 10 which may be performed in the illustrated and described sequence. As seen in FIG. 2, an initial or first primary wrap lead $22a_1$-A for the first phase is wrapped 180 degrees around the termination side 24 in the first, counterclockwise direction from a first winding $18_1$-A of the first phase to the primary base lead $22a_0$-A associated with a third winding $18_3$-A of the first phase. FIG. 3 illustrates a second primary wrap lead $22a_2$-A for the first phase that is wrapped 90 degrees around the termination side 24 in the first, counterclockwise direction from a second winding $18_2$-A of the first phase to the primary base lead $22a_0$-A. FIG. 4 illustrates a last or third primary wrap lead $22a_3$-A for the first phase that is wrapped 90 degrees around the termination side 24 in a second, clockwise direction from a fourth winding $18_4$-A of the first phase to the primary base lead $22a_0$-A. The primary wrap leads for the first phase are joined together to define a first phase primary lead connection 23a-A.

Figure 5:
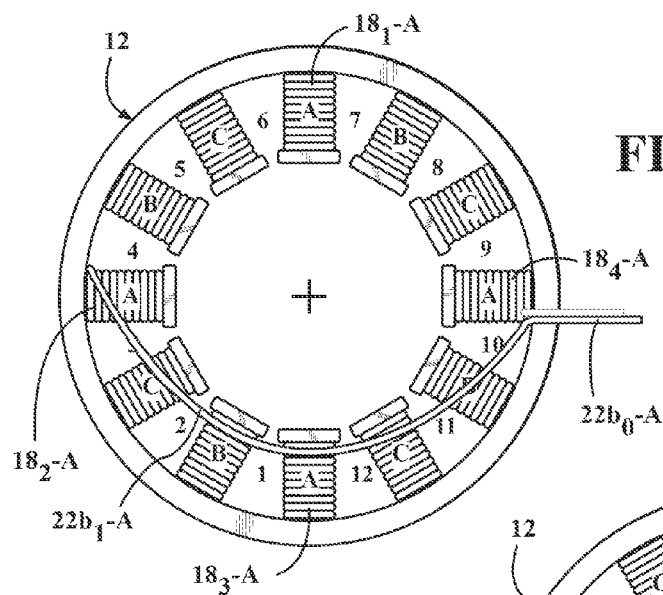
FIGS. 5-7 illustrate steps for wrapping secondary leads of the first phase windings on the stator.
Figure 6:
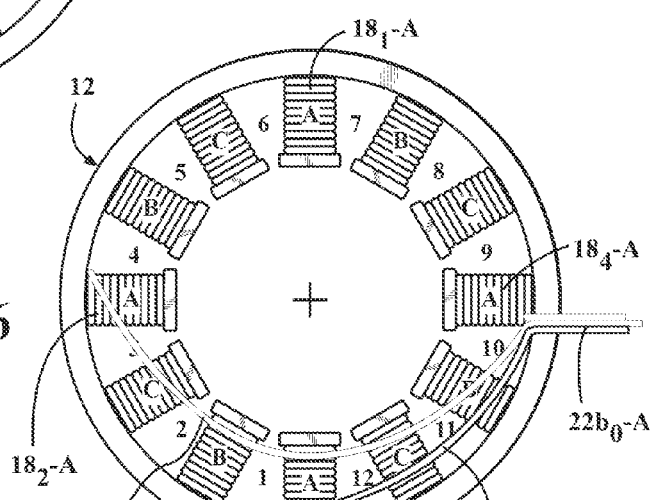
Figure 7:
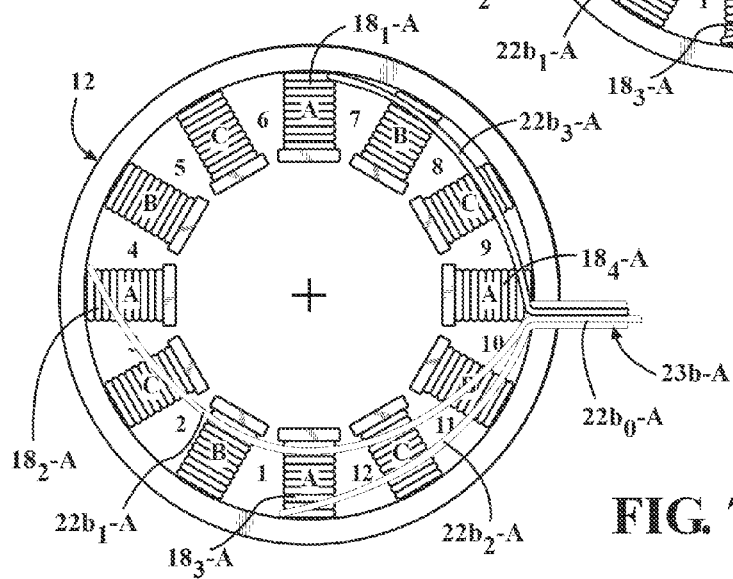

FIGS. 5-7 illustrate a wrapping operation for the secondary leads 22b of the first phase A for the wound stator 10 which may be performed in the illustrated and described sequence. As seen in FIG. 5, an initial or first secondary wrap lead $22b_1$-A for the first phase is wrapped 180 degrees around the termination side 24 in the first, counterclockwise direction from the second winding $18_2$-A to the secondary base lead $22b_0$-A associated with the fourth winding $18_4$-A of the first phase. FIG. 6 illustrates a second secondary wrap lead $22b_2$-A for the first phase that is wrapped 90 degrees around the termination side 24 in the first, counterclockwise direction from the third winding $18_3$-A to the secondary base lead $22b_0$-A. FIG. 7 illustrates a last or third secondary wrap lead $22b_3$-A for the first phase that is wrapped 90 degrees around the termination side 24 in the second, clockwise direction from the first winding $18_1$-A to the secondary base lead $22b_0$-A. The secondary wrap leads for the first phase are joined together to define a first phase secondary lead connection 23b-A.

It can be seen that the secondary base lead $22b_0$-A is circumferentially displaced from the primary base lead $22a_0$-A by 90 degrees. Further, a comparison of the area of the termination side 24 swept by the secondary leads 22b of the first phase, as seen by comparing FIGS. 5-7 to FIGS. 2-4, shows that the secondary leads 22b overlap, i.e., cross over and engage, portions of each of the primary leads 22a to bias the primary leads 22a axially toward the stator stack 12.

It should be noted that a guide may provided to direct the leads 22a, 22b in a circumferential direction around the inner diameter of the stator stack 12 during the wrapping process. For example, as seen in FIG. 1, a mandrel 30 may be provided for engagement with the termination end of the stator stack 12 during the wrapping process. The mandrel 30 may have a cylindrical base 32 and a conical body 34. The base 32 defines a diameter that is slightly larger than the inner diameter of the stator stack 12, as defined by the inner surfaces 16 of the teeth 14, and provides a surface around which the leads 22a, 22b may be drawn as they are directed to the respective base leads. The conical body 34 facilitates guiding the leads 22a, 22b to the surface of the base 32. In addition, the base 32 includes an insert portion 36 defining a diameter substantially equal to, or slightly less than, the inner diameter of the stator stack 12 for engaging the inner diameter of the stator stack 12, and maintaining the mandrel 30 in position on the stator stack 12 during the wrapping process.

Figure 8:
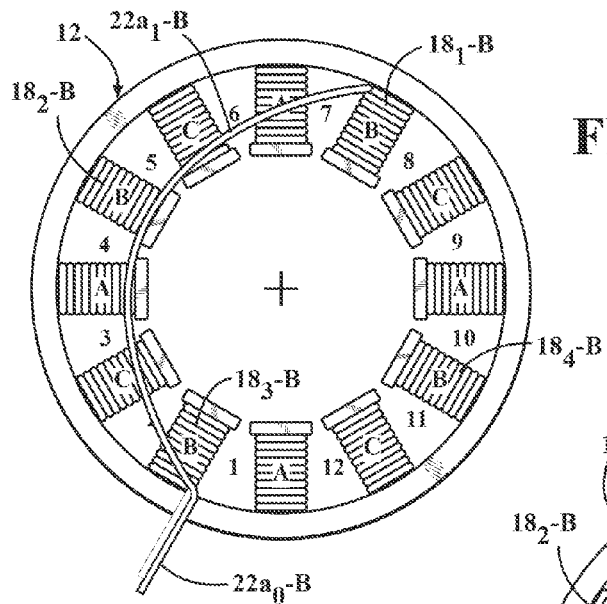
FIGS. 8-10 illustrate steps for wrapping primary leads of second phase windings on the stator.
Figure 9:
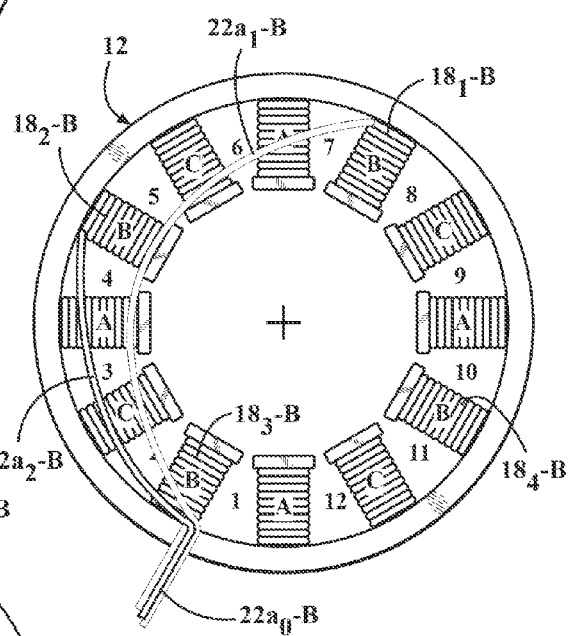
Figure 10:
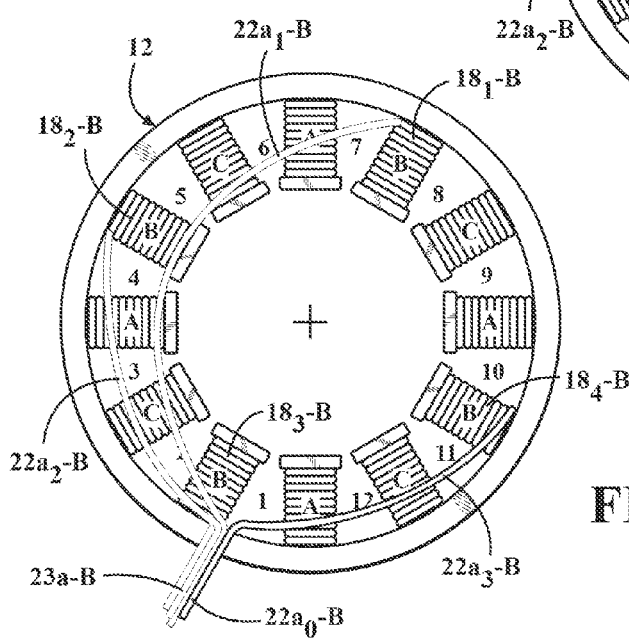

FIGS. 8-10 illustrate a wrapping operation for the primary leads 22a of a second phase B for the wound stator 10 which may be performed in the illustrated and described sequence subsequent to the steps described for wrapping the leads of the first phase. As seen in FIG. 8, an initial or first primary wrap lead $22a_1$-B for the second phase is wrapped 180 degrees around the termination side 24 in the first, counterclockwise direction from a first winding $18_1$-B of the second phase to the primary base lead $22a_0$-B associated with a third winding $18_3$-B of the second phase. FIG. 9 illustrates a second primary wrap lead $22a_2$-B for the second phase that is wrapped 90 degrees around the termination side 24 in the first, counterclockwise direction from a second winding $18_2$-B of the second phase to the primary base lead $22a_0$-B. FIG. 10 illustrates a last or third primary wrap lead $22a_3$-B for the second phase that is wrapped 90 degrees around the termination side 24 in a second, clockwise direction from a fourth winding $18_4$-B of the second phase to the primary base lead $22a_0$-B. The primary wrap leads for the second phase are joined together to define a second phase primary lead connection 23a-B.

Figure 11:
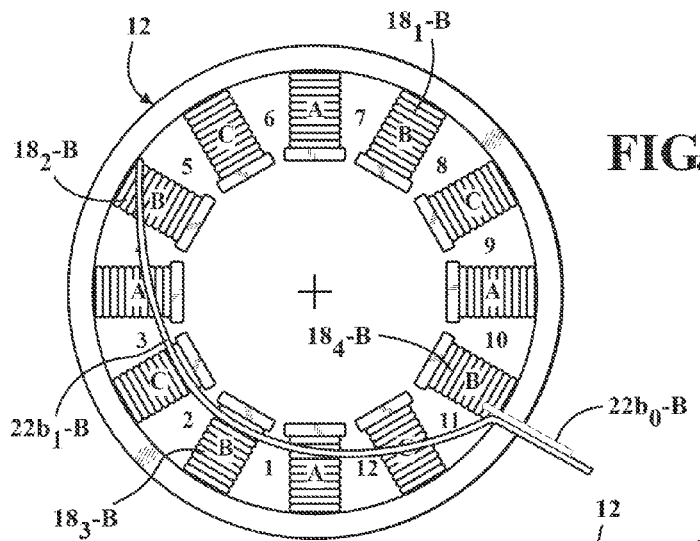
FIGS. 11-13 illustrate steps for wrapping secondary leads of the second phase windings on the stator.
Figure 12:
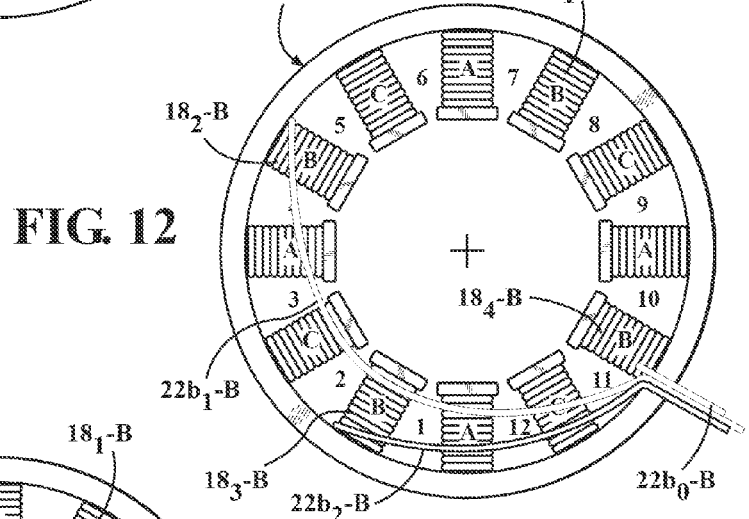
Figure 13:
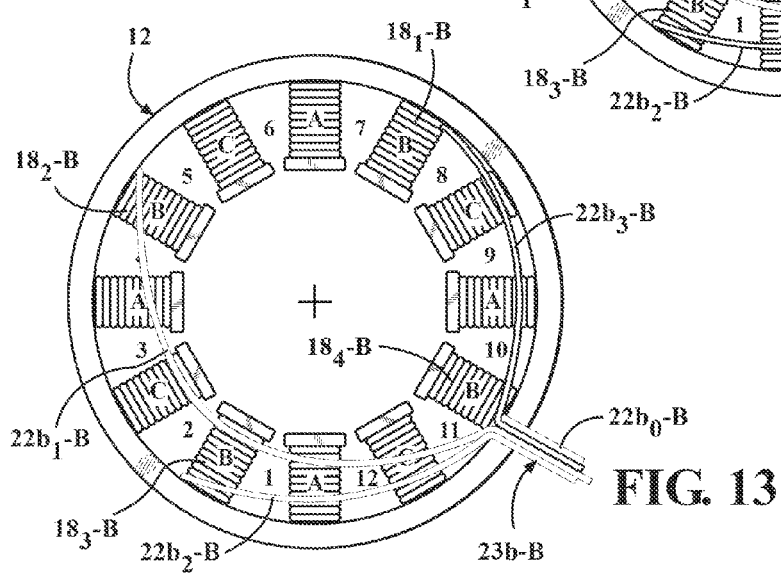

FIGS. 11-13 illustrate a wrapping operation for the secondary leads 22b of the second phase B for the wound stator 10 which may be performed in the illustrated and described sequence. As seen in FIG. 11, an initial or first secondary wrap lead $22b_1$-B for the second phase is wrapped 180 degrees around the termination side 24 in the first, counterclockwise direction from the second winding $18_2$-B to the secondary base lead $22b_0$-B associated with the fourth winding $18_4$-B of the second phase. FIG. 12 illustrates a second secondary wrap lead $22b_2$-B for the second phase that is wrapped 90 degrees around the termination side 24 in the first, counterclockwise direction from the third winding $18_3$-B to the secondary base lead $22b_0$-B. FIG. 13 illustrates a last or third secondary wrap lead $22b_3$-B for the second phase that is wrapped 90 degrees around the termination side 24 in the second, clockwise direction from the first winding $18_1$-B to the secondary base lead $22b_0$-B. The secondary wrap leads for the second phase are joined together to define a second phase secondary lead connection 23b-B.

It can be seen that the lead wrapping of the primary and secondary leads 22a, 22b of the second phase B is circumferentially displaced clockwise from the lead wrapping of the respective primary and secondary leads 22a, 22b of the first phase A by one tooth 14 of the stator stack 12. Hence, the lead wrapping of the second phase substantially overlaps the lead wrapping of the first phase to bias the first phase axially toward the stator stack 12. Further, as described above with regard to the lead wrapping of the first phase, the secondary base lead $22b_0$-B of the second phase is circumferentially displaced from the primary base lead $22a_0$-B by 90 degrees, such that the secondary leads $22b$ overlap, i.e., cross over and engage, portions of each of the primary leads $22a$ of the second phase to bias the primary leads $22a$ axially toward the stator stack 12.

Figure 14:
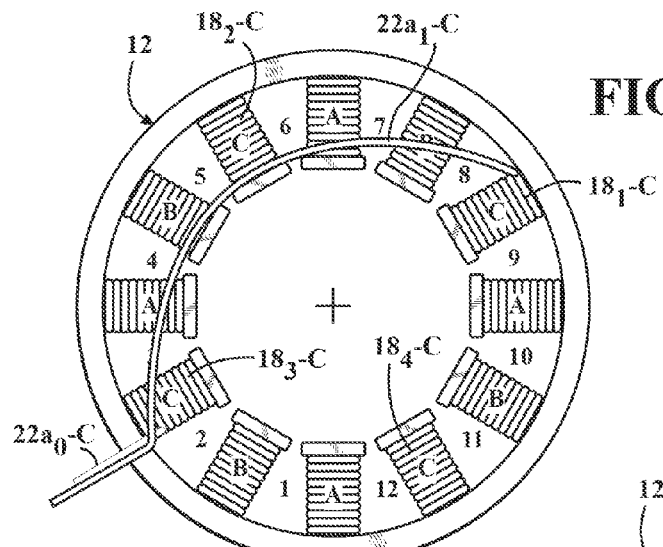
FIGS. 14-16 illustrate steps for wrapping primary leads of third phase windings on the stator.
Figure 15:
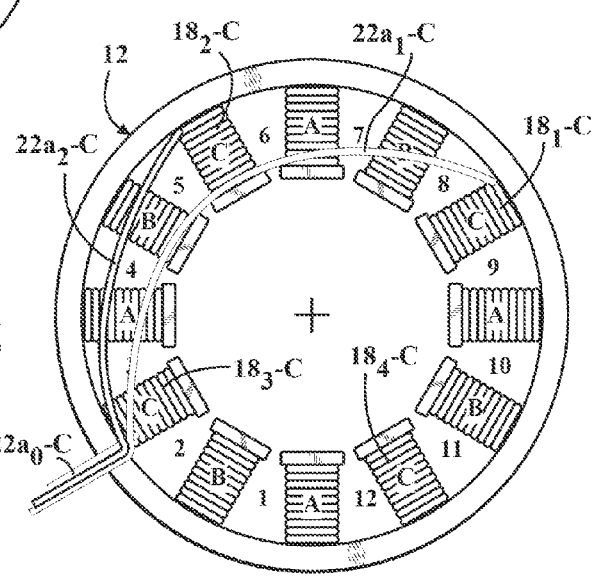
Figure 16:
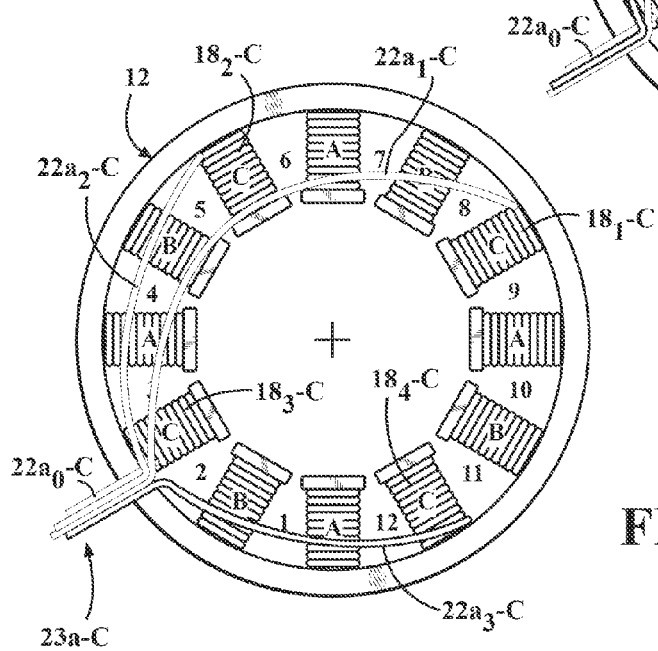

FIGS. 14-16 illustrate a wrapping operation for the primary leads $22a$ of a third phase C for the wound stator 10 which may be performed in the illustrated and described sequence subsequent to the steps described for wrapping the leads of the second phase. As seen in FIG. 14, an initial or first primary wrap lead $22a_1$-C for the third phase is wrapped 180 degrees around the termination side 24 in the first, counterclockwise direction from a first winding $18_1$-C of the third phase to the primary base lead $22a_0$-C associated with a third winding $18_3$-C of the third phase. FIG. 15 illustrates a second primary wrap lead $22a_2$-C for the third phase that is wrapped 90 degrees around the termination side 24 in the first, counterclockwise direction from a second winding $18_2$-C of the third phase to the primary base lead $22a_0$-C. FIG. 16 illustrates a last or third primary wrap lead $22a_3$-C for the third phase that is wrapped 90 degrees around the termination side 24 in a second, clockwise direction from a fourth winding $18_4$-C of the third phase to the primary base lead $22a_0$-C. The primary wrap leads for the third phase are joined together to define a third phase primary lead connection $23a$-C.

Figure 17:
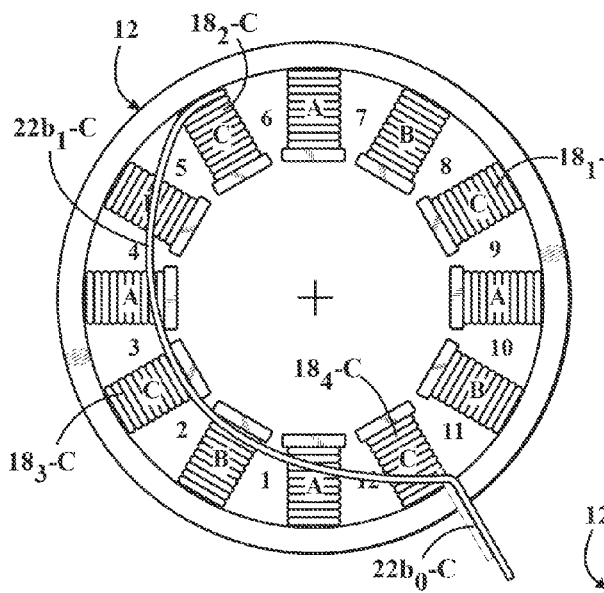
FIGS. 17-19 illustrate steps for wrapping secondary leads of the third phase windings on the stator.
Figure 18:
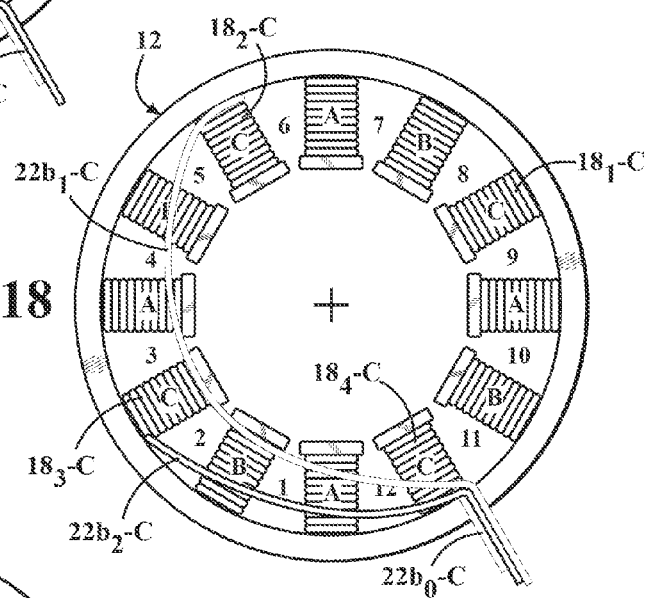
Figure 19:
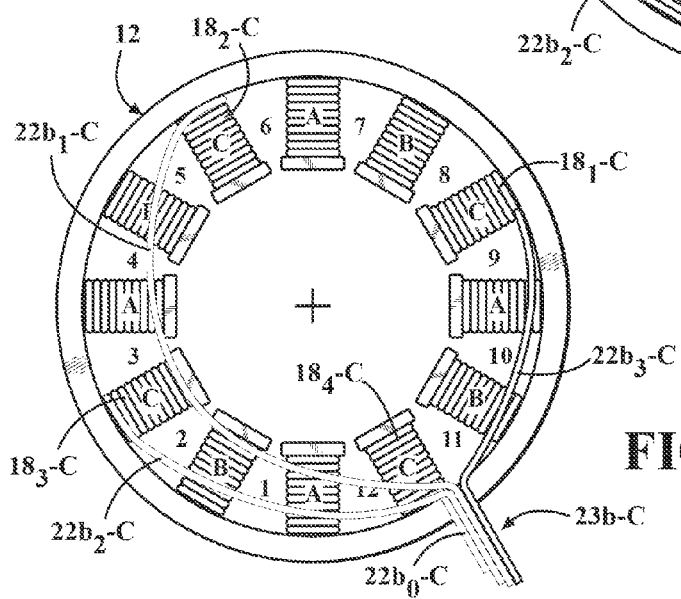

FIGS. 17-19 illustrate a wrapping operation for the secondary leads $22b$ of the third phase C for the wound stator 10 which may be performed in the illustrated and described sequence. As seen in FIG. 17, an initial or first secondary wrap lead $22b_1$-C for the third phase is wrapped 180 degrees around the termination side 24 in the first, counterclockwise direction from the second winding $18_2$-C to the secondary base lead $22b_0$-C associated with the fourth winding $18_4$-C of the third phase. FIG. 18 illustrates a second secondary wrap lead $22b_2$-C for the third phase that is wrapped 90 degrees around the termination side 24 in the first, counterclockwise direction from the third winding $18_3$-C to the secondary base lead $22b_0$-C. FIG. 19 illustrates a last or third secondary wrap lead $22b_3$-C for the third phase that is wrapped 90 degrees around the termination side 24 in the second, clockwise direction from the first winding $18_1$-C to the secondary base lead $22b_0$-C. The secondary wrap leads for the third phase are joined together to define a third phase secondary lead connection $23b$-C.

It can be seen that the lead wrapping of the primary and secondary leads $22a$, $22b$ of the third phase C is circumferentially displaced clockwise from the lead wrapping of the respective primary and secondary leads $22a$, $22b$ of the second phase B. Hence, the lead wrapping of the third phase substantially overlaps the lead wrapping of the first and second phases to bias these phases axially toward the stator stack 12. Further, as described above with regard to the lead wrapping of the first and second phases, the secondary base lead $22b_0$-C of the third phase is circumferentially displaced from the primary base lead $22a_0$-C by 90 degrees, such that the secondary leads $22b$ overlap, i.e., cross over and engage, portions of each of the primary leads $22a$ of the third phase to bias the primary leads $22a$ axially toward the stator stack 12.

Further, it should be understood that by providing the above-described wrapping operation in which the leads $22a$, $22b$ for the phases are wrapped across each other in the described pattern, multiple leads $22a$, $22b$ may extend in different directions, i.e., clockwise and counterclockwise, to form a woven-type end and create a substantially tight nesting of the leads $22a$, $22b$ against each other to maintain the leads in close association with the termination end 24 of the stator stack 12.

Figure 20:
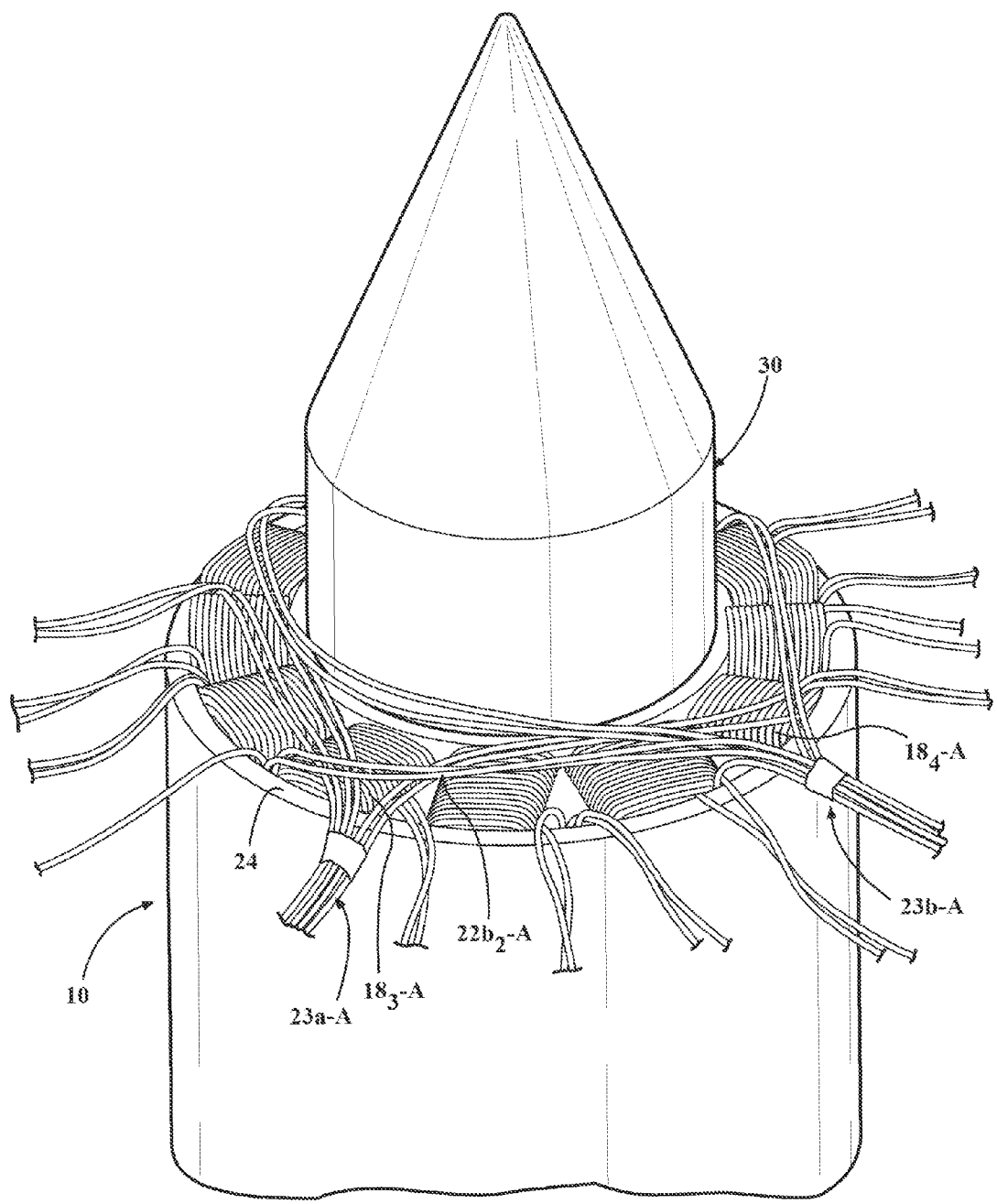
FIG. 20 is a perspective view of the termination side of a stator at the conclusion of the wrapping operation for the first phase primary and secondary leads.
Figure 21:
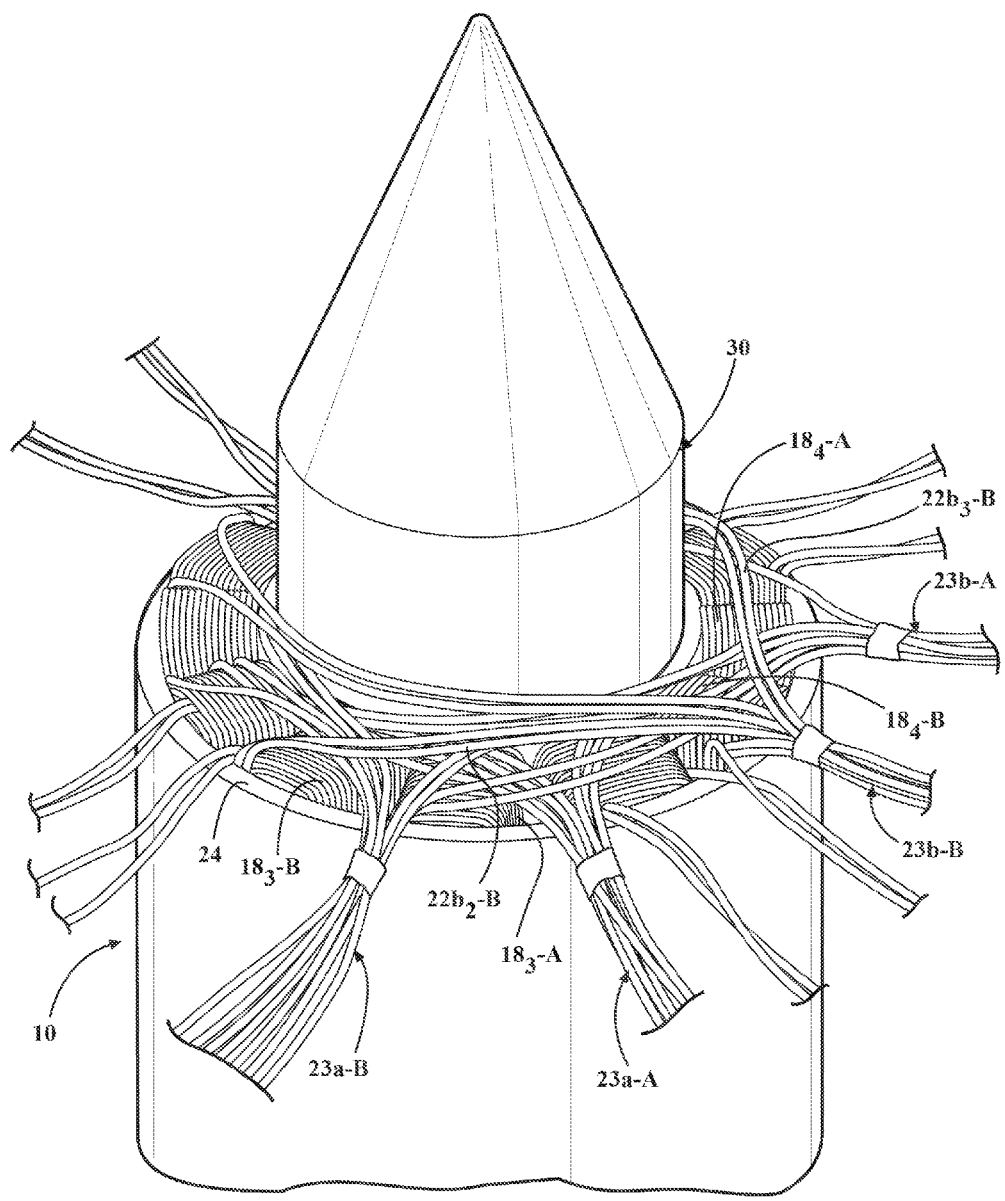
FIG. 21 is a perspective view of the termination side of the stator at the conclusion of the wrapping operation for the second phase primary and secondary leads.
Figure 22:
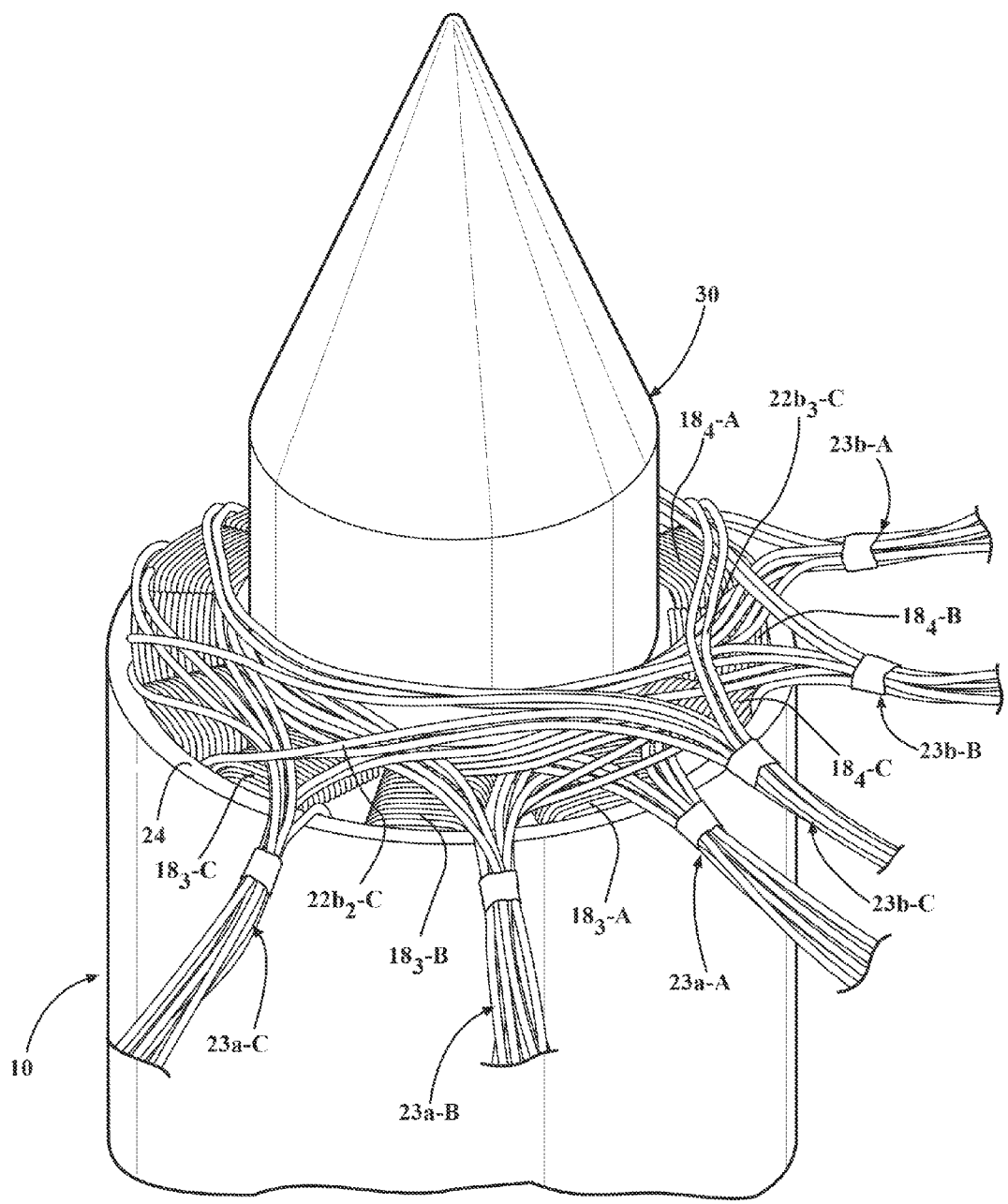
FIG. 22 is a perspective view of the termination side of the stator at the conclusion of the wrapping operation for the third phase primary and secondary leads.

Referring to FIGS. 20-22, the termination end 24 of the stator 10 is shown at different stages of the wrapping process to illustrate the interaction of the different leads $22a$, $22b$ to form a woven-type end construction. FIG. 20 illustrates the end of the stator 10 at the conclusion of wrapping the primary and secondary leads $22a$, $22b$ of the first phase A. It can be seen that the secondary leads $22b$ overlap the primary leads $22a$. For example, it can be seen that the secondary wrap lead $22b_2$-A extends across the primary wrap leads forming the primary lead connection $23a$-A at the third winding $18_3$-A to substantially retain the leads closely adjacent to the third winding $18_3$-A of the first phase.

FIG. 21 illustrates the end of the stator 10 at the conclusion of wrapping the primary and secondary leads $22a$, $22b$ of the second phase B. It can be seen that the secondary leads $22b$ overlap the primary leads $22a$ of the second phase and overlap the leads of the first phase. For example, it can be seen that the secondary wrap lead $22b_2$-B extends across the primary wrap leads forming the lead connection $23a$-B at the third winding $18_3$-B of the second phase, and also extends across the wrap leads forming the lead connection $23a$-A at the third winding $18_3$-A of the first phase. Also, it may be seen that the secondary wrap lead $22b_3$-B extends across the wrap leads forming the secondary lead connection $23b$-A at the fourth winding $18_4$-A of the first phase.

FIG. 22 illustrates the end of the stator 10 at the conclusion of wrapping the primary and secondary leads $22a$, $22b$ of the third phase C. It can be seen that the secondary leads $22b$ overlap the primary leads $22a$ of the third phase and overlap the primary and secondary leads of the first and second phases. For example, it can be seen that the secondary wrap lead $22b_2$-C extends across the primary wrap leads forming the lead connection $23a$-C at the third winding $18_3$-C of the third phase, and also extends across the wrap leads forming the lead connections $23a$-B and $23a$-A at the third windings $18_3$-B and $18_3$-A of the of the second and first phases, respectively. Also, it may be seen that the secondary wrap lead $22b_3$-C extends across the wrap leads forming the secondary lead connection $23b$-A and the secondary lead connection $23b$-B at the fourth windings $18_4$-A and $18_4$-B of the first and second phases, respectively.

Figure 23:
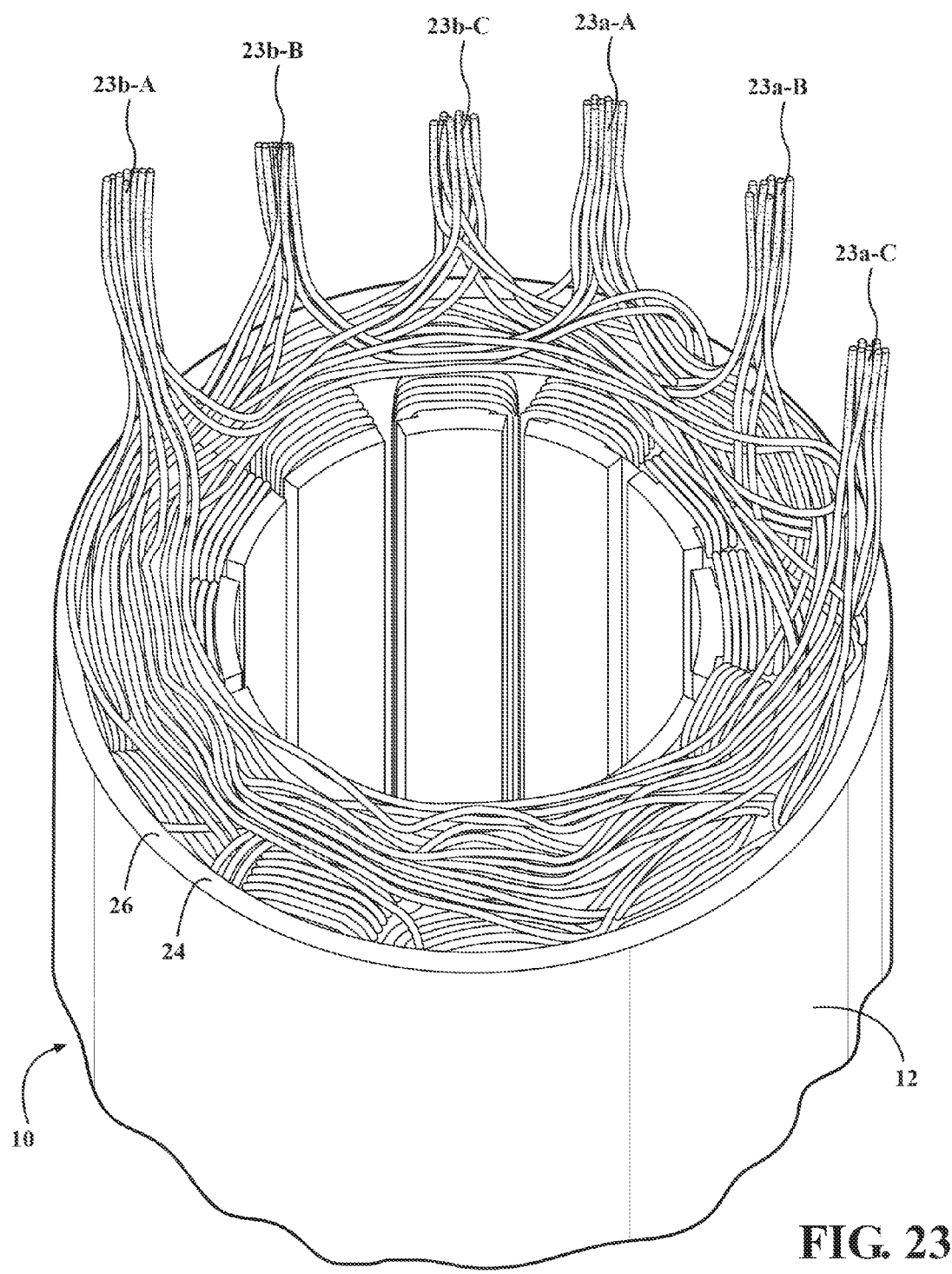
FIG. 23 is a perspective view of the termination side of the stator following completion of the primary and secondary lead connections.

It should be noted that the above described wrapping of leads only identifies exemplary overlaps of the leads adjacent to windings where the lead connections are formed. However, the primary and secondary leads $22a$, $22b$ define multiple points of engagement around the periphery 26 of the terminal end 24 of the stator 10 to create a substantially tightly wrapped formation of wires forming the lead connections, as seen in FIG. 23. As may also be seen in FIG. 23, the lead connections $23a$-A, $23a$-B, $23a$-C, $23b$-A, $23b$-B, $23b$-C may be formed by twisting and soldering the respective wrap leads forming the connections.

FIGS. 24-29 illustrate an alternative embodiment for performing a wrapping process on the wrap leads $22a$, $22b$. In the alternative wrapping process, three leads comprising either three primary leads $22a$ for each of the three phases or three secondary leads $22b$ for each of the three phases, are wrapped to respective base leads simultaneously.

Figure 24:
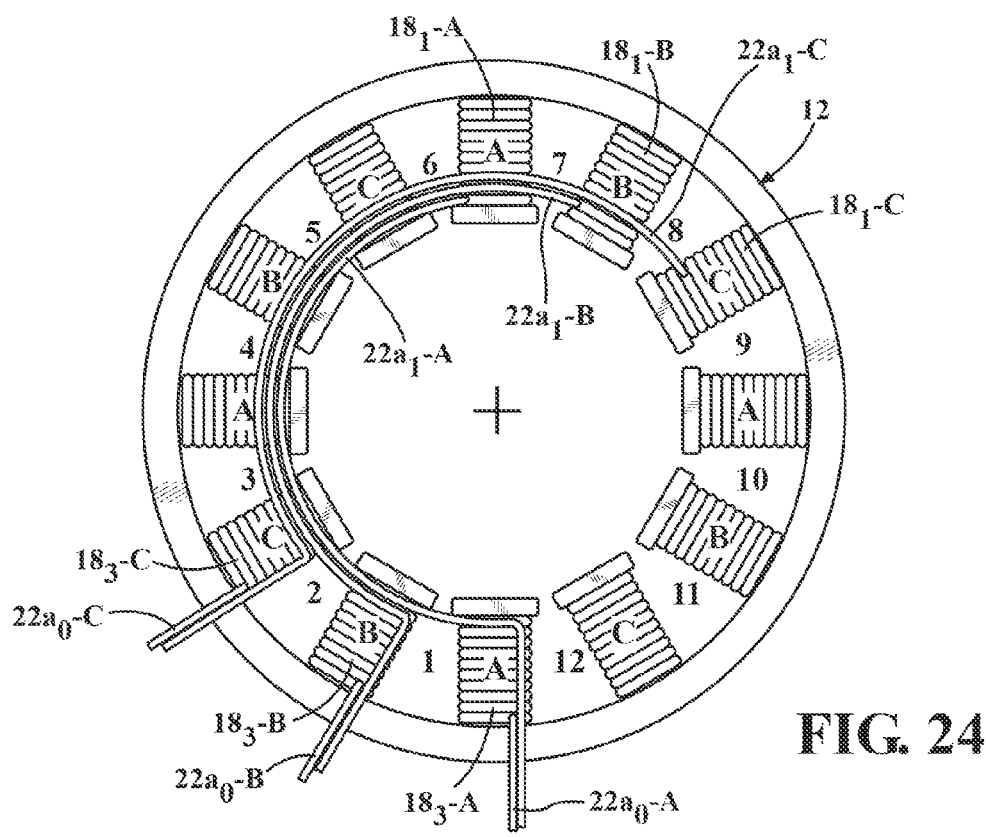
FIG. 24 illustrates simultaneous wrapping of first primary leads of three phases in accordance with a second embodiment of the invention.

As seen in FIG. 24, first primary leads $22a_1$-A, $22a_1$-B, $22a_1$-C are wrapped in a first, counterclockwise direction from respective first windings $18_1$-A, $18_1$-B, $18_1$-C to respective primary base leads $22a_0$-A, $22a_0$-B, $22a_0$-C associated with respective third windings $18_3$-A, $18_3$-B, $18_3$-C. The first primary leads $22a_1$-A, $22a_1$-B, $22a_1$-C may be wrapped substantially simultaneously around the peripheral portion 26 of the termination side 24.

Figure 25:
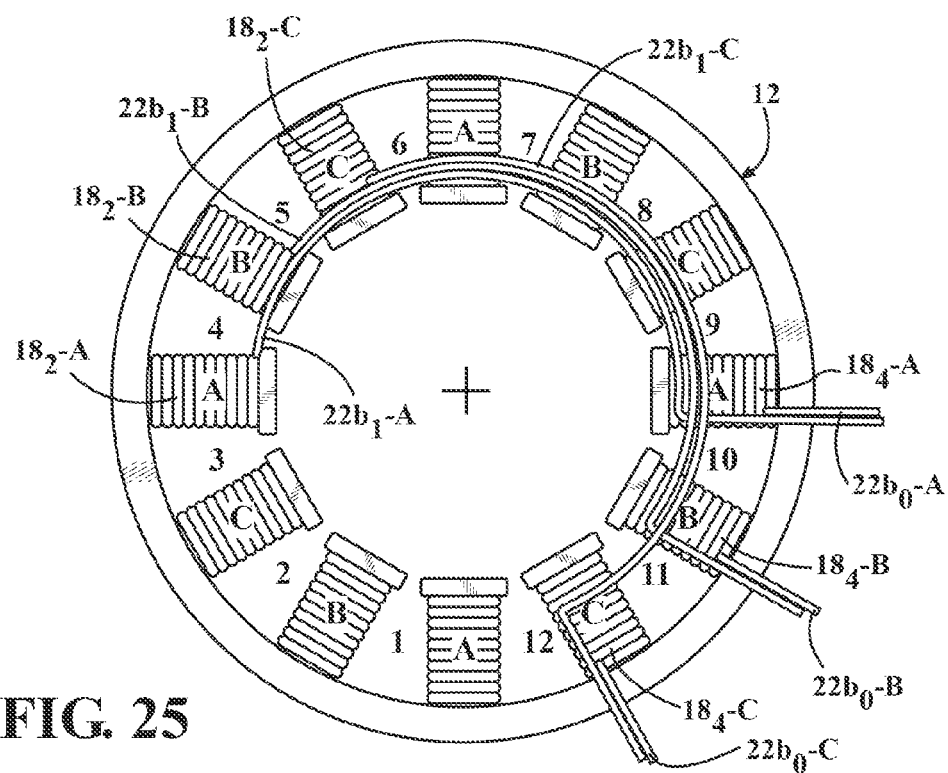
FIG. 25 illustrates simultaneous wrapping of first secondary leads of three phases in accordance with the second embodiment of the invention.

In a subsequent step, as illustrated in FIG. 25, first secondary leads $22b_1$-A, $22b_1$-B, $22b_1$-C are wrapped in a second, counterclockwise direction from respective second windings $18_2$-A, $18_2$-B, $18_2$-C to respective secondary base leads $22b_0$-A, $22b_0$-B, $22b_0$-C associated with respective fourth windings $18_4$-A, $18_4$-B, $18_4$-C. The first secondary leads $22b_1$-A, $22b_1$-B, $22b_1$-C may be wrapped substantially simultaneously around the peripheral portion 26 of the termination side 24.

Figure 26:
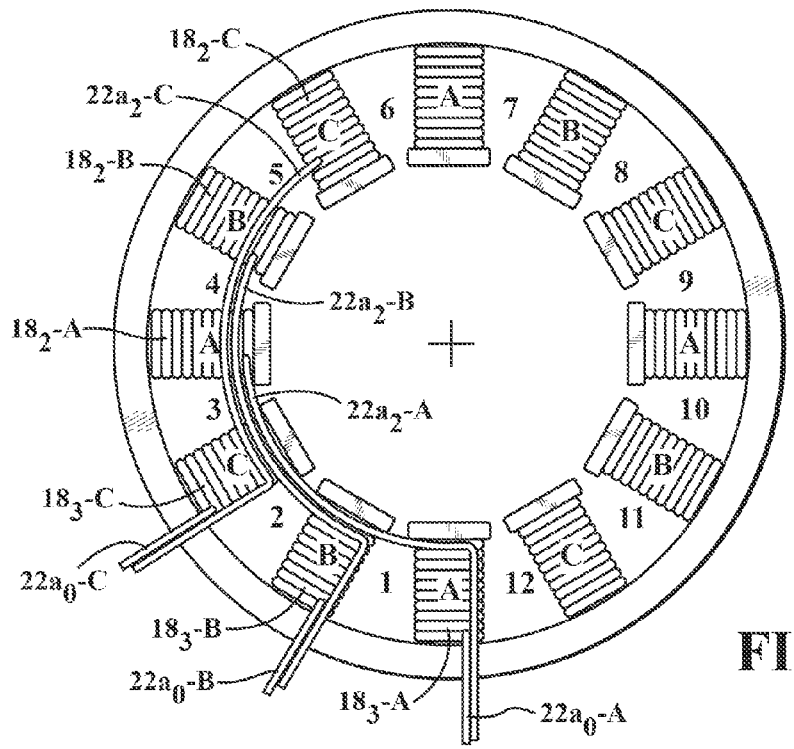
FIG. 26 illustrates simultaneous wrapping of second primary leads of three phases in accordance with the second embodiment of the invention.

In a subsequent step, as illustrated in FIG. 26, second primary leads $22a_2$-A, $22a_2$-B, $22a_2$-C are wrapped in the first direction from respective second windings $18_2$-A, $18_2$-B, $18_2$-C to the respective primary base leads $22a_0$-A, $22a_0$-B, $22a_0$-C associated with the respective third windings $18_3$-A, $18_3$-B, $18_3$-C. The second primary leads $22a_2$-A, $22a_2$-B, $22a_2$-C may be wrapped substantially simultaneously around the peripheral portion 26 of the termination side 24.

Figure 27:
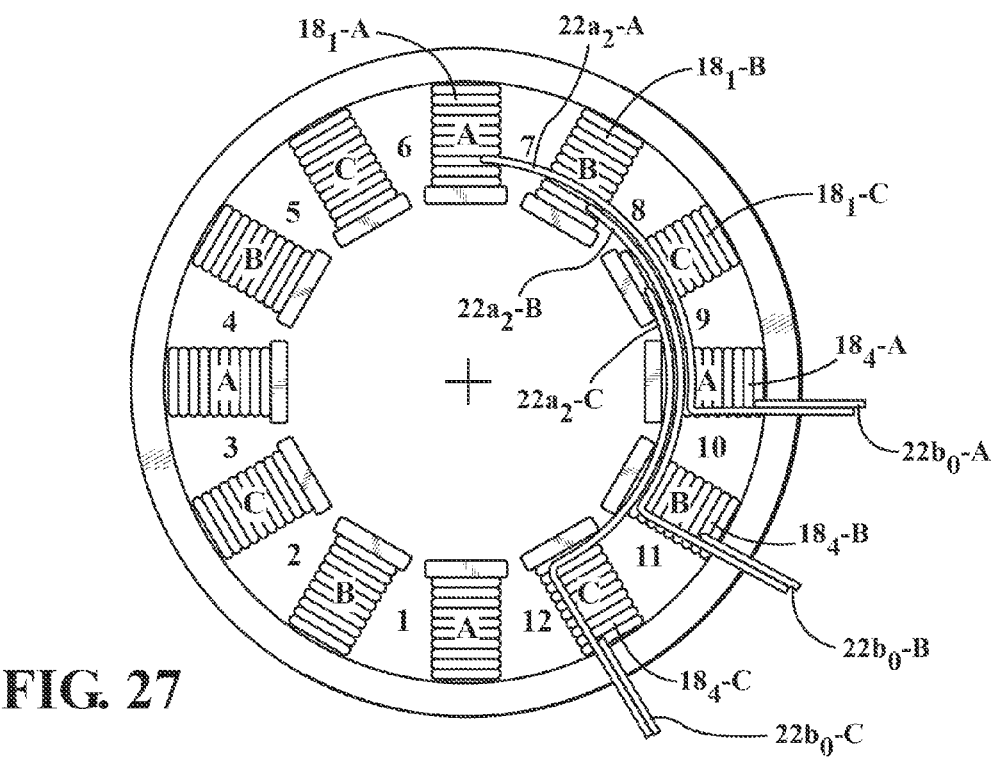
FIG. 27 illustrates simultaneous wrapping of second secondary leads of three phases in accordance with the second embodiment of the invention.

In a subsequent step, as illustrated in FIG. 27, second secondary leads $22b_2$-A, $22b_2$-B, $22b_2$-C are wrapped in the second direction from respective first windings $18_1$-A, $18_1$-B, $18_1$-C to the respective secondary base leads $22b_0$-A, $22b_0$-B, $22b_0$-C associated with the respective fourth windings $18_4$-A, $18_4$-B, $18_4$-C. The second secondary leads $22b_2$-A, $22b_2$-B, $22b_2$-C may be wrapped substantially simultaneously around the peripheral portion 26 of the termination side 24.

Figure 28:
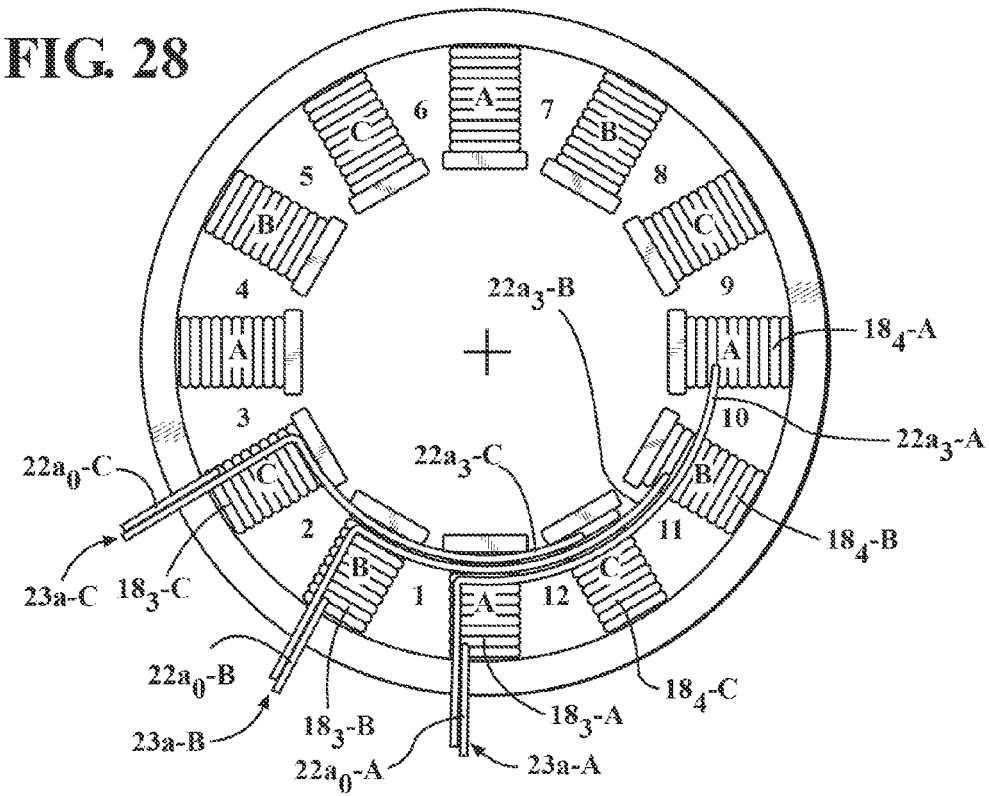
FIG. 28 illustrates simultaneous wrapping of third primary leads of three phases in accordance with the second embodiment of the invention.

In a subsequent step, as illustrated in FIG. 28, third primary leads $22a_3$-A, $22a_3$-B, $22a_3$-C are wrapped in the second direction (clockwise) from respective fourth windings $18_4$-A, $18_4$-B, $18_4$-C to the respective primary base leads $22a_0$-A, $22a_0$-B, $22a_0$-C associated with the respective third windings $18_3$-A, $18_3$-B, $18_3$-C. The third primary leads $22a_3$-A, $22a_3$-B, $22a_3$-C may be wrapped substantially simultaneously around the peripheral portion 26 of the termination side 24.

Figure 29:
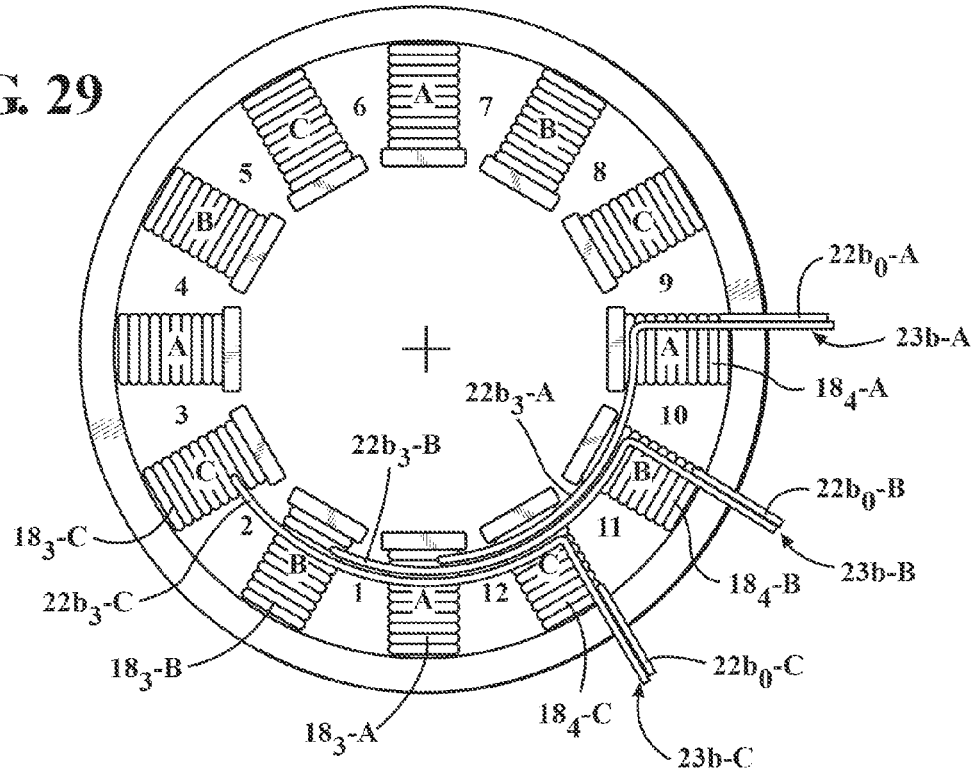
FIG. 29 illustrates simultaneous wrapping of third secondary leads of three phases in accordance with the second embodiment of the invention.

In a subsequent step, as illustrated in FIG. 29, third secondary leads $22b_3$-A, $22b_3$-B, $22b_3$-C are wrapped in the first direction (counterclockwise) from respective third windings $18_3$-A, $18_3$-B, $18_3$-C to the respective secondary base leads $22b_0$-A, $22b_0$-B, $22b_0$-C associated with the respective fourth windings $18_4$-A, $18_4$-B, $18_4$-C. The third secondary leads $22b_3$-A, $22b_3$-B, $22b_3$-C may be wrapped substantially simultaneously around the peripheral portion 26 of the termination side 24.

It can be seen that in the alternative embodiment of FIGS. 24-29, each subsequent group of leads 22a, 22b overlaps one or more previously wrapped group of leads, and may extend in different directions, i.e., clockwise and counterclockwise, to form a woven-type end and create a substantially tight nesting of the leads 22a, 22b against each other to maintain the leads in close association with the termination end 24 of the stator stack 12.

In each of the embodiments described above, the windings 18 are individually formed on each of the teeth 14 prior to forming connections between the windings 18 of each phase, and the windings 18 of each phase are connected in parallel with each other subsequent to completion of the windings 18. By completing the windings 18 on all the teeth 14 prior to forming connections between the windings 18, it is possible to increase the slot fill of the wound stator 10 in comparison to prior winding configurations such as, for example, series wound stators. In particular, it is believed that the present method may provide slot fills of at least about 75-80%.

Further, the described wrapping operation provides a plurality of conductive paths across the termination side 24 of the stator 10 without requiring additional connecting structure for providing connections between the windings 18. In particular, the leads 22a, 22b define cross-overs, i.e., extending across the slots of the stator around the termination side 24, to form conductive paths between the windings 18 of each phase without incorporation of a termination plate or other conductive structure.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of winding a dynamo-electric stator, the method comprising:
   providing a stator having a plurality of radially inwardly extending teeth;
   providing a plurality of wire turns around each of said teeth to form a wire winding on each of said teeth, said windings comprising first, second and third phase windings;
   each said winding comprising a primary lead defined by a free end of said wire forming said winding and a secondary lead defined by a free end of said wire forming said winding, said primary and secondary leads extending from opposite sides of a respective tooth on a termination side of said stator;
   each said phase comprising a plurality of said windings wherein each said phase comprises a winding having a primary lead defining a primary base lead, a winding having a secondary lead defining a secondary base lead, two or more windings having primary leads defining at least an initial primary wrap lead and a last primary wrap lead, and two or more windings having secondary leads defining at least an initial secondary wrap lead and a last secondary wrap lead;
   performing an end wrapping operation for each phase comprising:
      wrapping said initial primary wrap lead in a first circumferential direction around said termination side of said stator to a primary base lead of a respective phase;
      wrapping said last primary wrap lead in a second circumferential direction, opposite to said first direction, around said termination side of said stator to said primary base lead of a respective phase;
      wrapping said initial secondary wrap lead in said first circumferential direction around said termination side of said stator to a secondary base lead of a respective phase;
      wrapping said last secondary wrap lead in said second circumferential direction around said termination side of said stator to said secondary base lead of a respective phase;
      joining the wrap leads associated with each of said primary and secondary base leads to form a primary and secondary lead connection for each of said phases, said joining comprising connecting free ends of respective windings in engagement with each other for each of said primary and secondary lead connections; and
   wherein said initial wrap leads comprise first wrap leads and said last wrap leads comprise third wrap leads, and further comprising a second primary and secondary wrap lead for each phase, said end wrapping operation further comprising, for each phase:

wrapping said second primary wrap lead in said first direction around said termination side of said stator to a primary base lead of a respective phase; and wrapping said second secondary wrap lead in said first direction around said termination side of said stator to a secondary base lead of a respective phase.

2. The method of claim 1, wherein for each phase:

said first and second primary wrap leads are wrapped around said termination side of said stator prior to said third primary wrap lead; and said first and second secondary wrap leads are wrapped around said termination side of said stator prior to said third secondary wrap lead.

3. The method of claim 1, wherein said end wrapping operation is initially performed on said first phase, and each of said primary and secondary leads of each phase subsequent to said first phase overlaps one or more of the primary and secondary leads of preceding phases for which an end wrapping operation has been performed.

4. The method of claim 1, wherein cross-overs are formed by portions of said leads extending circumferentially across slots defined by two or more of said teeth, and all of said cross-overs are formed subsequent to completion of formation of said wire windings on each of said teeth.

5. The method of claim 4, wherein subsequent to forming a wire winding on each of said teeth, and prior to performing said end wrapping operation, positioning a mandrel at said terminal side of said stator, said mandrel having a diameter at least as large as an inner diameter of said stator for receiving a rotor, said mandrel guiding said primary and secondary leads around a peripheral portion of said stator surrounding said inner diameter.

6. The method of claim 1, wherein said windings connected to said primary and secondary lead connections for each phase are connected in parallel for each respective phase.

7. The method of claim 1, wherein said stator comprises a unitary member including said plurality of teeth, and said providing a plurality of wire turns around each of said teeth comprises feeding wire through slots defined by said teeth from within an inner diameter of said stator.

8. A wound stator for a dynamo-electric machine comprising:

a stator having a plurality of circumferentially spaced, radially inwardly extending teeth;

a plurality of discrete strands of wire, each strand of wire forming a plurality of turns around a respective tooth to define a winding on said respective tooth;

each said winding comprising a primary lead defined by a free end of a respective one of said discrete strands of wire and a secondary lead defined by another free end of said respective one of said discrete strands of wire wherein each of said primary and secondary leads are located on a termination side of said stator;

one of said primary leads defining a primary base lead, and one of said secondary leads defining a secondary base lead;

a plurality of conductive paths extending from each of a plurality of said windings to said primary base lead and a plurality of conductive paths extending from said plurality of windings to said secondary base lead;

each of said conductive paths comprising one of said primary and secondary leads without additional conductive structure extending between said plurality of windings and said primary and secondary base leads;

said windings comprise first, second and third phase windings, and each said phase comprising a primary lead defining a primary base lead and a secondary lead defining a secondary base lead and, for each phase:

a plurality of conductive paths comprising said primary leads and defining primary wrap leads extending from each of a plurality of respective ones of said windings to a respective one of said primary base leads;

a plurality of conductive paths comprising said secondary leads and defining secondary wrap leads extending from each of said plurality of respective ones of said windings to a respective one of said secondary base leads;

said teeth include inner ends defining an inner diameter of said stator for receiving a rotor, wherein:

for each said primary base lead, at least one of said primary wrap leads extending in a first circumferential direction around a peripheral portion of said stator surrounding said inner diameter to said primary base lead, and at least one of said primary wrap leads extending in a second circumferential direction, opposite said first direction, to said primary base lead; and for each said secondary base lead, at least one of said secondary wrap leads extending in said first circumferential direction around said peripheral portion of said stator to said secondary base lead, and at least one of said secondary wrap leads extending in said second circumferential direction, opposite said first direction, to said secondary base lead; and wherein each said secondary base lead for a phase is circumferentially displaced around the peripheral portion of said stator three teeth from a primary base lead corresponding to the same phase.

9. The wound stator of claim 8, wherein said primary wrap leads for each phase are joined to a respective primary base lead to form a primary lead connection for the phase, and said secondary wrap leads for each phase are joined to a respective secondary base lead to form a secondary lead connection for the phase, wherein said windings connected to said primary and secondary lead connections for each phase are connected in parallel for each respective phase.

10. A method of winding a dynamo-electric stator, the method comprising:

providing a stator having a plurality of radially inwardly extending teeth;

providing a plurality of wire turns around each of said teeth to form a wire winding on each of said teeth, said windings comprising first, second and third phase windings;

each said winding comprising a primary lead defined by a free end of said wire forming said winding and a secondary lead defined by a free end of said wire forming said winding, said primary and secondary leads extending from opposite sides of a respective tooth on a termination side of said stator;

each said phase comprising a plurality of said windings wherein each said phase comprises a winding having a primary lead defining a primary base lead, a winding having a secondary lead defining a secondary base lead, two or more windings having primary leads defining at least an initial primary wrap lead and a last primary wrap lead, and two or more windings having secondary leads defining at least an initial secondary wrap lead and a last secondary wrap lead;

performing an end wrapping operation for said first, second and third phases, comprising:

wrapping said initial primary wrap leads in a first circumferential direction around said termination side of said stator to a primary base lead of a respective phase;

wrapping said initial secondary wrap leads in a second circumferential direction, opposite to said first direction, around said termination side of said stator to a secondary base lead of a respective phase;

wrapping said last primary wrap leads in said second circumferential direction around said termination side of said stator to said primary base lead of a respective phase;

wrapping said last secondary wrap leads in said first circumferential direction around said termination side of said stator to said secondary base lead of a respective phase;

joining the wrap leads associated with each of said primary and secondary base leads to form a primary and secondary lead connection for each of said phases, said joining comprising connecting free ends of respective windings in engagement with each other for each of said primary and secondary lead connections; and wherein said initial wrap leads comprise first wrap leads and said last wrap leads comprise third wrap leads, and further comprising a second primary and secondary wrap lead for each phase, said end wrapping operation further comprising, for said first, second and third phases:

wrapping said second primary wrap leads in said first direction around said termination side of said stator to a primary base lead of a respective phase; and wrapping said second secondary wrap leads in said second direction around said termination side of said stator to a secondary base lead of a respective phase.

11. The method of claim 10, wherein said end wrapping operation is initially performed on said first primary and secondary leads of said first, second and third phases, and each of said second and third leads of said first, second and third phases overlaps one or more of said first primary and secondary leads.

12. The method of claim 10, wherein cross-overs are formed by portions of said leads extending circumferentially across slots defined by two or more of said teeth, and all of said cross-overs are formed subsequent to completion of formation of said wire windings on each of said teeth.

13. The method of claim 12, wherein subsequent to forming a wire winding on each of said teeth, and prior to performing said end wrapping operation, positioning a mandrel at said terminal side of said stator, said mandrel having a diameter at least as large as an inner diameter of said stator for receiving a rotor, said mandrel guiding said primary and secondary leads around a peripheral portion of said stator surrounding said inner diameter.

14. The method of claim 10, wherein said windings connected to said primary and secondary lead connections for each phase are connected in parallel for each respective phase.

* * * * *